(12) United States Patent
Kajiya

(10) Patent No.: US 8,803,399 B2
(45) Date of Patent: Aug. 12, 2014

(54) ROTOR WITH REINFORCED SQUIRREL-CAGE CONDUCTIVE BODY AND MANUFACTURING METHOD THEREOF

(71) Applicant: Fanuc Corporation, Yamanashi (JP)

(72) Inventor: Takafumi Kajiya, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 13/723,769

(22) Filed: Dec. 21, 2012

(65) Prior Publication Data

US 2013/0207505 A1    Aug. 15, 2013

(30) Foreign Application Priority Data

Feb. 14, 2012  (JP) .................................. 2012-029745

(51) Int. Cl.
  *H02K 15/12* (2006.01)
(52) U.S. Cl.
  USPC ............................................ 310/211; 29/598
(58) Field of Classification Search
  USPC ................................ 310/211, 156.78; 29/598
  IPC ............................ H02K 17/16,17/165, 15/0012
  See application file for complete search history.

(56) References Cited

U.S. PATENT DOCUMENTS

| 5,444,319 A * | 8/1995 | Nakamura et al. ............. 310/211 |
| 5,473,211 A | 12/1995 | Arkkio |
| 2013/0106233 A1* | 5/2013 | Hanamachi ................... 310/211 |

FOREIGN PATENT DOCUMENTS

| CN | 2031587 U | 1/1989 |
| CN | 1032341 C | 7/1996 |
| CN | 101104325 A | 1/2008 |
| JP | 50004204 U | 1/1975 |
| JP | 3-261354 A | 11/1991 |
| JP | 10-127022 A | 5/1998 |
| JP | 2838896 B2 | 12/1998 |
| JP | 2911315 B2 | 6/1999 |
| JP | 2012019164 A | 1/2012 |
| JP | 2012019634 A | 1/2012 |

OTHER PUBLICATIONS

Kazuhiko Sakaki, "Overview of cold spray technology and cold sprayed light metal coatings", Journal of Japan Institute of Light Metals, vol. 56, No. 7, pp. 376-385 (2006).
Japanese Office Action dated Apr. 2, 2013 with Partial Translation (4 pages).
Office Action mailed Nov. 22, 2013, corresponds to Chinese patent application No. 201310050105.3.

* cited by examiner

*Primary Examiner* — Dang Le
(74) *Attorney, Agent, or Firm* — Lowe Hauptman & Ham, LLP

(57) ABSTRACT

A rotor including a cylindrical iron core having a through hole for receiving a rotational shaft, and a squirrel-cage conductive body including a plurality of conductive bars and a pair of annular conductive end rings provided at both ends of the plurality of conductive bars is provided. The conductive bars extend along a direction in which the rotational shaft is received and are arranged at an outer circumference of the iron core at certain intervals. The rotor further includes a conductive reinforcing layer extends on at least a part of an outer surface of the conductive end ring. The conductive reinforcing layer is formed by spraying conductive particles in a solid phase onto the outer surface of the conductive end ring.

6 Claims, 7 Drawing Sheets

ROTOR WITH REINFORCED SQUIRREL-CAGE CONDUCTIVE BODY AND MANUFACTURING METHOD THEREOF

RELATED APPLICATIONS

The present application is based on, and claims priority from, Japanese Application Number 2012-029745, filed Feb. 14, 2012, the disclosure of which is hereby incorporated by reference herein in its entirety.

BACKGROUND OF THE INVENTION

1. Field of the Invention

The present invention relates to a rotor provided with a squirrel-cage conductive body and used for, for example, an induction motor, and to a manufacturing method thereof.

2. Description of the Related Art

Recently, there is an increased need for a rotational electric motor operable at a high speed. When an electric motor operates at a high speed, centrifugal force acting on components of the rotor increases, which results in deformation of a conductive end ring, or possibly, in breakage thereof. In order to prevent it, a reinforcing member, for example, is attached to the conductive end ring (refer to JP 3-261354 A, JP 10-127022 A, JP 2838896 B, and JP 2911315 B). However, such a reinforcing member needs to be specially designed, depending on the shape of the rotor, particularly on the shape of the conductive end ring. Accordingly, the number of components that have to be managed is increased, resulting in increased cost. If the rotor has a complicated shape, the cost for producing the reinforcing member is thereby increased. Further, when an iron core of the rotor is intended to be skewed, the amount of skew may be restricted due to limitation related to the size and the shape of the reinforcing member.

Reference should also be made to Kazuhiko Sakaki, "Overview of cold spray technology and cold sprayed light metals coatings," Journal of Japan Institute of Light Metals, Vol. 56, No. 7 (2006), pages 376 to 385, in which the principle of a cold spray process, a process for forming aluminum/titanium coatings and properties of such coatings are described.

According to the present invention, a rotor, particularly a rotor that can be reinforced regardless of a shape of a conductive end ring, and a manufacturing method thereof are provided.

SUMMARY OF THE INVENTION

According to a first invention of the present application, a rotor is provided, the rotor including a cylindrical iron core having a through hole for receiving a rotational shaft, and a squirrel-cage conductive body including a plurality of conductive bars and a pair of annular conductive end rings provided at both ends of the plurality of conductive bars, the conductive bars extending along a direction in which the rotational shaft is received and being arranged at an outer circumference of the iron core at certain intervals, wherein a conductive reinforcing layer extends on at least a part of an outer surface of the conductive end ring, the conductive reinforcing layer being formed by spraying conductive particles in a solid phase onto the outer surface of the conductive end ring.

According to a second invention of the present application, in the rotor of the first invention, the conductive reinforcing layer further extends on at least a part of an outer surface of the iron core.

According to a third invention of the present application, in the rotor of the first or second invention, the conductive particles of the conductive reinforcing layer are made of a non-magnetic material.

According to a fourth invention of the present application, in the rotor of the third invention, the non-magnetic material is stainless steel, titanium, or titanium alloy.

According to a fifth invention of the present application, a manufacturing method for manufacturing a rotor is provided, the rotor including a cylindrical iron core having a through hole for receiving a rotational shaft, and a squirrel-cage conductive body including a plurality of conductive bars and a pair of annular conductive end rings provided at both ends of the plurality of conductive bars, the conductive bars extending along a direction in which the rotational shaft is received and being arranged at an outer circumference of the iron core at certain intervals, wherein the method includes spraying conductive particles in a solid phase onto at least a part of an outer surface of the conductive end ring so as to form a conductive reinforcing layer thereon.

According to a sixth invention of the present application, the method of the fifth invention includes spraying conductive particles in a solid phase onto at least a part of an outer surface of the iron core so as to further form a conductive reinforcing layer thereon.

These and other objects, features and advantages of the present invention will be more apparent in light of the detailed description of exemplary embodiments thereof as depicted by the drawings.

DETAILED DESCRIPTION

In the following, embodiments of the present invention will be described with reference to the accompanying drawings. In the illustrated embodiments, each element may not be depicted in scale according to the practical application for better understanding or for convenience of explanation.

Figure 1:
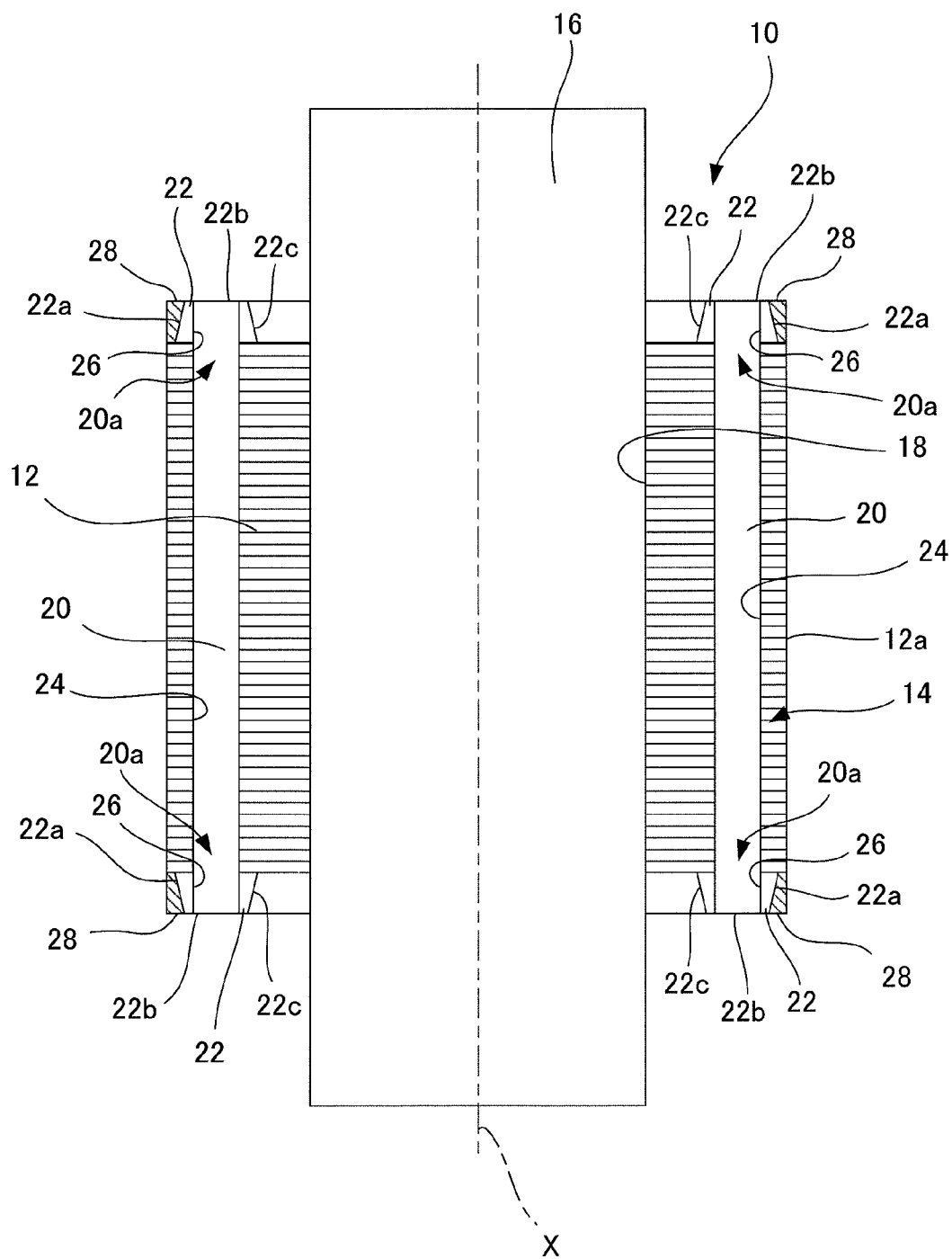
FIG. 1 is a sectional view schematically illustrating a rotor according to a first embodiment of the present invention.

FIG. 1 is a sectional view schematically illustrating a rotor 10 according to a first embodiment of the present invention. The rotor 10 includes a substantially cylindrical iron core 12, and a squirrel-cage conductive body 14. A through hole 18 is formed in the iron core 12 for receiving a rotational shaft 16 having a rotational axis X. The squirrel-cage conductive body 14 includes a plurality of conductive bars 20, and a pair of annular conductive end rings 22. The conductive bars 20 extend along a direction in which the rotational shaft 16 is received, and are arranged at an outer circumference of the iron core 12 at certain intervals. The annular conductive end rings 22 are formed respectively at both end portions 20a and 20a of the conductive bars 20.

The rotor 10 may form an induction motor in cooperation with a stator, which is not shown. The stator includes multiple phases of coils. When three-phase alternating current, for example, flows through the coils, the stator generates a rotating magnetic field. On the other hand, current is generated in the conductive bars 20 of the squirrel-cage conductive body 14. The rotating magnetic field and the current interact with each other to produce a rotational driving force for rotating the rotor 10.

The iron core 12 is formed by stacking a plurality of plate members in the direction of the rotational axis X. The plate members may be formed by punching silicon steel plates, for example. The iron core 12 is provided with a plurality of slots 24 extending along the direction of the rotational axis X and being arranged at certain intervals in a circumferential direction of the iron core 12.

The conductive bar 20 is arranged within the slot 24 of the iron core 12. Both the end portions 20a and 20a of the conductive bar 20 are received in the through holes 26 formed in the conductive end rings 22, respectively. Preferably, both end surfaces of the conductive bar 20 lie on the same planes with end surfaces 22b of the conductive end ring 22, respectively. The conductive bars 20 and the conductive end rings 22 are formed from a conductive material such as copper, cooper alloy, aluminum, and aluminum alloy.

According to this embodiment, a conductive reinforcing layer 28 is formed on an outer circumferential surface 22a of the conductive end rings 22, as shown in FIG. 1. The conductive reinforcing layer 28 is formed by spraying conductive particles in a solid phase, as described below in further detail. Preferably, the conductive particles are made of a non-magnetic material so as to prevent a magnetic flux from leaking through the conductive reinforcing layer 28. For example, stainless steel, titanium or titanium alloy can be used as a non-magnetic material to form the conductive reinforcing layer 28.

The conductive reinforcing layer 28 formed on the outer circumferential surface 22a of the conductive end ring 22 increases structural strength of the conductive end ring 22. This configuration is especially effective when a rotational speed of the rotor 10 is raised. When the rotor 10 is rotated at a high speed with the outer circumferential surface 22a of the conductive end ring 22 being exposed without the conductive reinforcing layer 28, centrifugal force poses a risk of deforming the conductive end ring 22, or possibly damaging the conductive end ring 22. In contrast, in the rotor 10 according to the present embodiment, the conductive reinforcing layer 28 is formed from a material having a high specific strength such as stainless steel, titanium and titanium alloy, as described above. Accordingly, even when the rotor 10 is rotated at a high speed, structural strength of the rotor 10 remains sufficient so as to prevent the conductive end ring 22 from being damaged, and to extend service life of the electric motor. In addition, since the conductive reinforcing layer 28 is formed directly on the conductive end ring 22, there is no need for additional fixing means such as a fixing screw.

Figure 2:
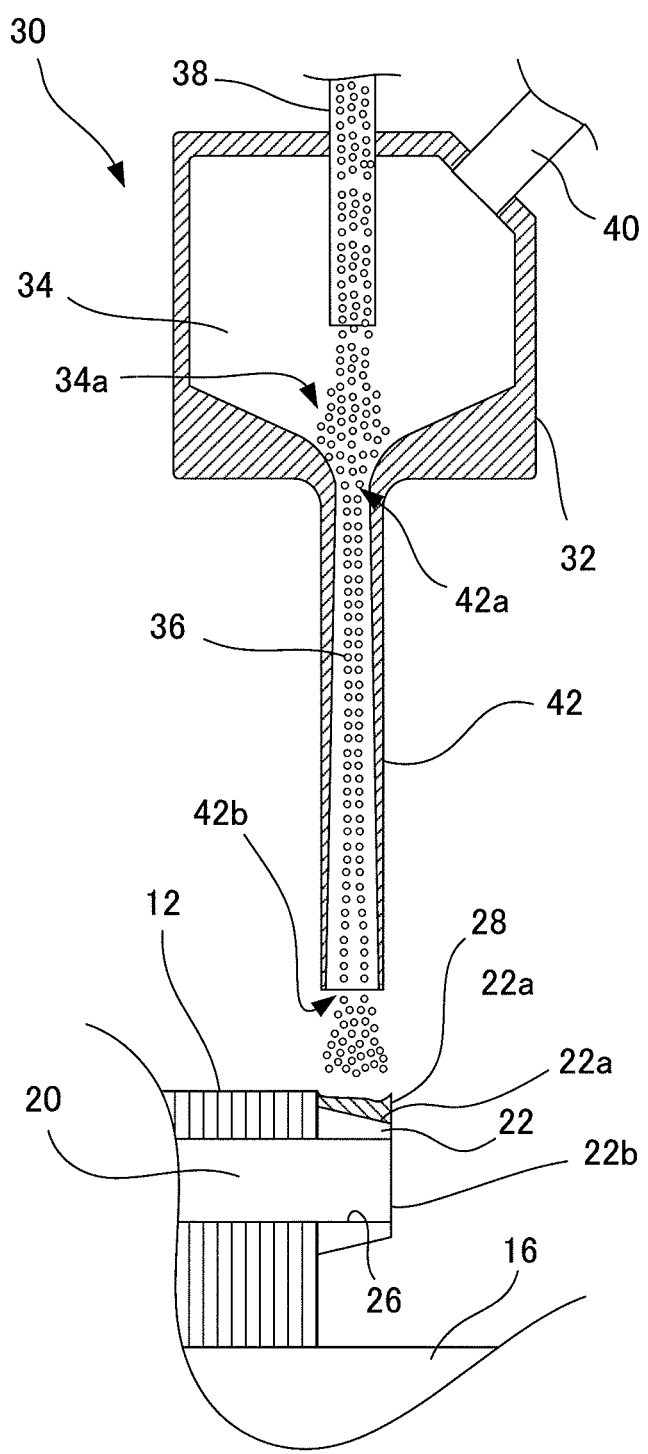
FIG. 2 shows a process of forming a conductive reinforcing layer.

Next, a method of manufacturing the rotor 10 will be described with reference to FIG. 2. FIG. 2 shows a process of forming the conductive reinforcing layer 28. Since processes other than the process of forming the conductive reinforcing layer 28 are performed by way of known technique, detailed description thereon is omitted.

FIG. 2 shows a part of a cold spray apparatus 30. In the present embodiment, the cold spray apparatus 30 is used to splay conductive particles in a solid state, according to a cold spray process. The cold spray process includes injecting particulate substances into a gas flow at high pressure and at normal temperature or at increased temperature, and striking the particulate substances, which remain in a solid phase, against a target structure so as to form a coating thereon. According to such a cold spray process, the metal coating with a high strength can be formed without causing heat denaturation. As a comparative example of coating processes, a metal spray process is known. The metal spray process involves a step of melting metal, and therefore, requires the metal to be cooled promptly. However, unless temperature at which the metal is cooled is properly controlled, an overgrown crystal structure may be caused, and as a result, strength of the metal layer is impaired. In contrast, according to the cold spray process, the heat denaturation of a conductive material does not occur as described above, and therefore more effective reinforcing effect can be achieved.

As illustrated, the cold spray apparatus 30 includes a conductive particles supplying pipe 38 for supplying conductive particles 36 to an interior 34 of a housing 32, a working gas supplying pipe 40 for supplying working gas at high pressure, for example, several megapascals, and a Laval nozzle 42 for accelerating the working gas up to supersonic speed. Conductive particles such as stainless steel, titanium, and titanium alloy, having a diameter of approximately 1 μm to 50 μm are used as conductive particles 36. The working gas may be, for example, nitrogen gas, helium gas, air or the like. The working gas may be heated by a heater (not shown) provided to the cold spray apparatus 30. In this case, temperature of the working gas at a nozzle inlet 34a is set, for example, within a range up to approximately 1000 degrees Celsius, depending on the specifications of the cold spray apparatus 30. The higher the temperature of the working gas, the more the gas speed and therefore a spraying speed of the conductive particles 36 is increased. In general, the higher the temperature of the working gas, the more efficient the conductive particles 36 are attached to the target structure. Therefore, temperature of the working gas is preferably set to be as high as possible within a range below a melting point of the conductive particles 36.

The Laval nozzle 42 includes a throat 42a at which a sectional area of a flow path is relatively small, and the flow path thereof gradually expands towards an outlet 42b. Within the Laval nozzle 42, the conductive particles 36 are accelerated up to in the range of speeds between approximately 300 m/s and approximately 1000 m/s. The conductive particles 36 are sprayed from the outlet 42b of the Laval nozzle 42 and struck against a target structure that is the outer circumferential surface 22a of the conductive end ring 22 in the present embodiment such that the conductive particles 36 are attached to the target structure, while remaining in a solid phase. In this way, a large number of conductive particles 36 are attached to the outer circumferential surface 22a of the conductive end ring 22, so as to form the conductive reinforcing layer 28. During the process of forming the conductive reinforcing layer 28, a jig is used to ensure that the conductive particles 36 are only attached to a desired portion. The thus-formed conductive reinforcing layer 28 has a thickness, not limited to but including, in the range between approximately several millimeters and several tens of millimeters so that the target structure has sufficient strength.

The conductive reinforcing layer 28 is shaped by means of cutting, for example, into a desired shape in a subsequent process. For example, as shown in FIG. 1, an outer circumferential surface of the conductive reinforcing layer 28 is formed so as to be flush with a plane on which the outer circumferential surface 12a of the iron core 12 extends. According to the cold spray process in which the conductive particles are sprayed, while maintaining its solid phase, the conductive reinforcing layer can be easily formed regardless of the shape of the target structure, such as the conductive end ring 22 and the iron core 12. Further, since the conductive reinforcing layer can be formed directly on the target structure, additional process such as screw fixing can be omitted.

Next, other embodiments of the present invention will be described. In the following explanation, the matters that have already been described in relation to the first embodiment are omitted as necessary. The same reference numerals are used to indicate the same or corresponding elements as or to those in the first embodiment.

Figure 3:
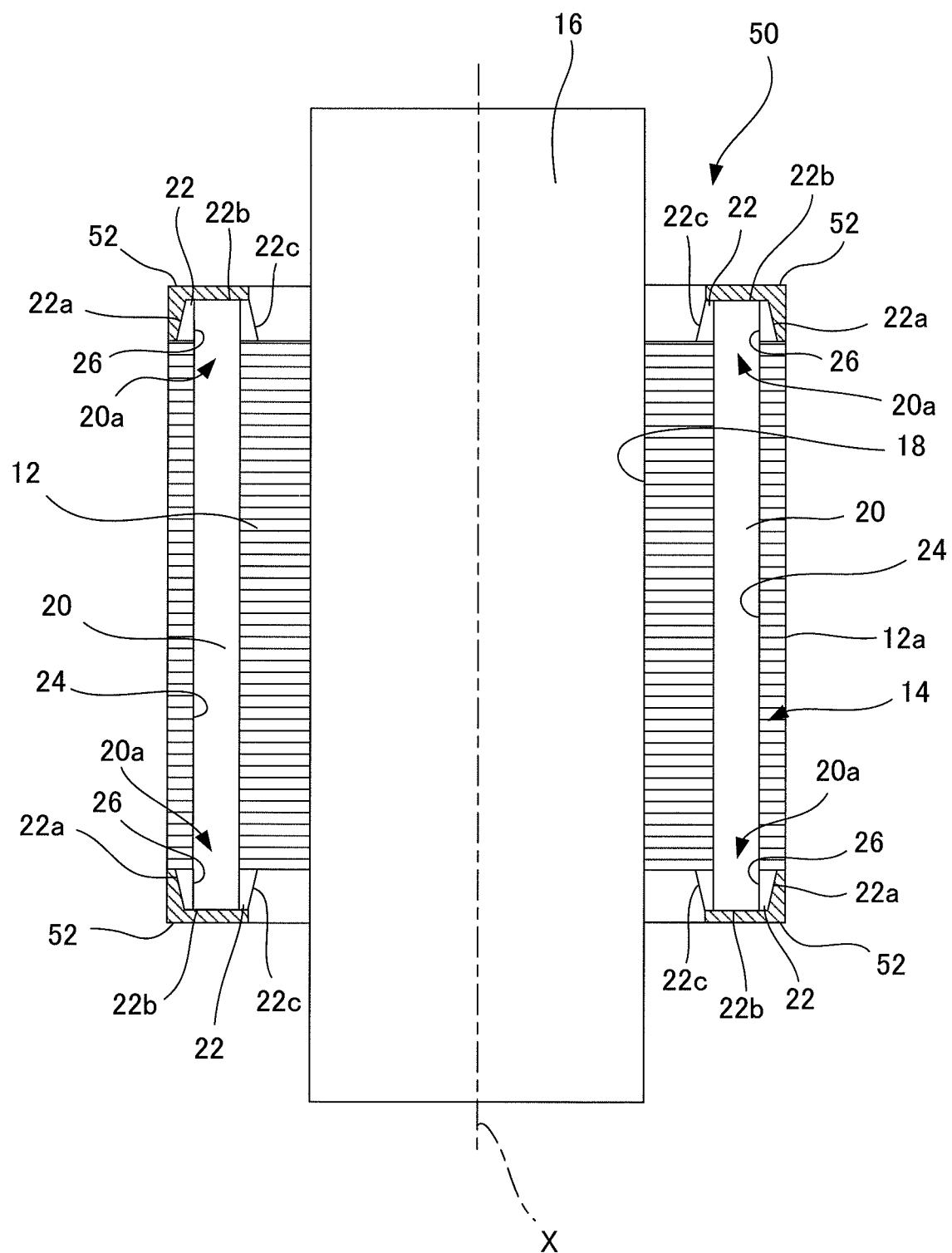
FIG. 3 is a sectional view schematically illustrating a rotor according to a second embodiment of the present invention.

FIG. 3 is a sectional view schematically illustrating a rotor 50 according to a second embodiment of the present invention. In the rotor 50 according to this embodiment, a conductive reinforcing layer 52 is further formed on an end surface 22b of the conductive end ring 22, in addition to the outer circumferential surface 22a of the conductive end ring 22. In this embodiment, the conductive reinforcing layer 52 may be formed on a certain portion as necessary with the aid of a jig, as described above. The conductive particles 36 may be sprayed from several different directions, as postures of the cold spray apparatus 30 or of the rotor 50 are changed. According to the present embodiment, both of the outer circumferential surface 22a and the end surface 22b of the conductive end ring 22 can be reinforced regardless of the shape of the conductive end ring 22.

Figure 4:
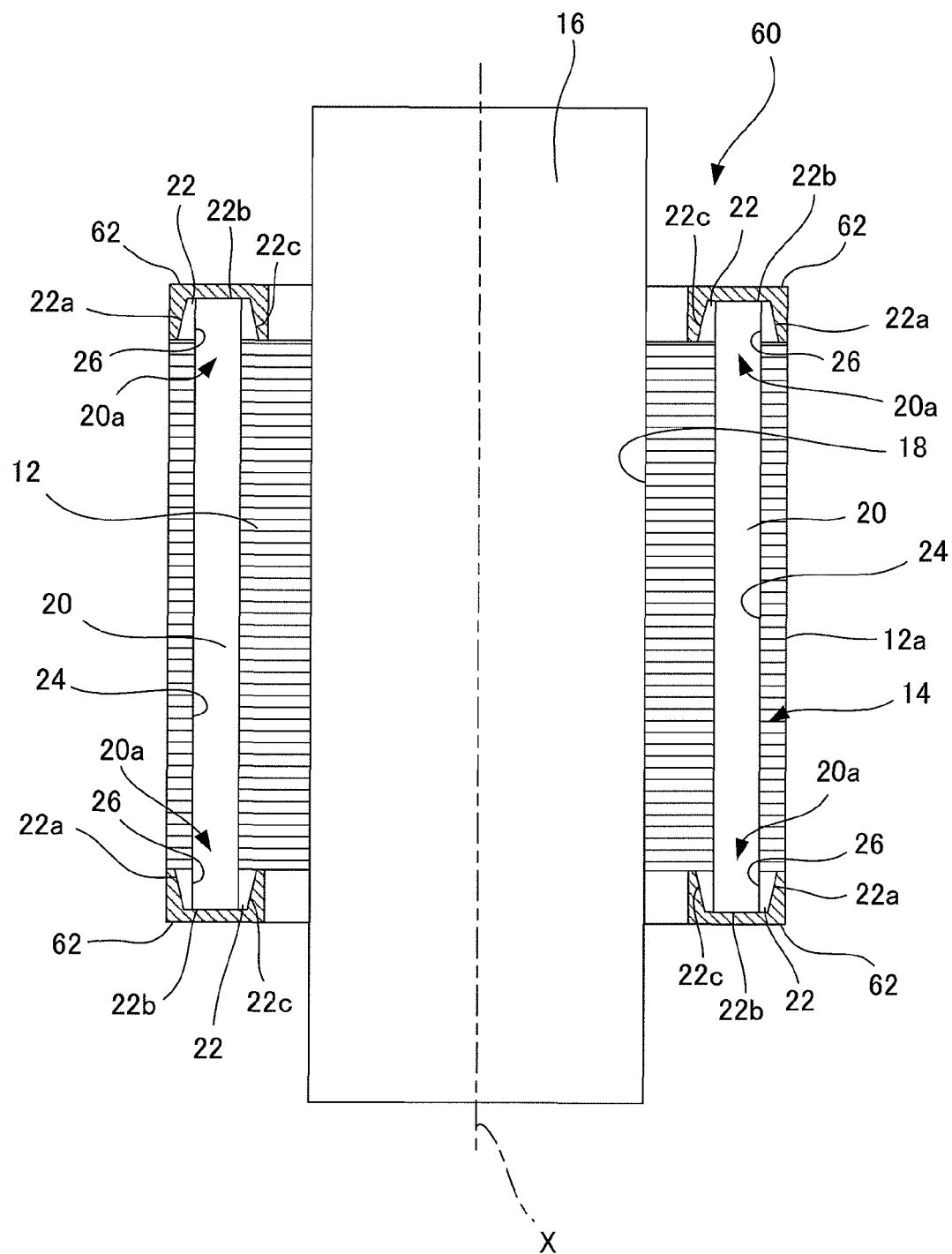
FIG. 4 is a sectional view schematically illustrating a rotor according to a third embodiment of the present invention.

FIG. 4 is a sectional view schematically illustrating a rotor 60 according to a third embodiment of the present invention. In the rotor 60 according to this embodiment, a conductive reinforcing layer 62 is formed on an inner circumferential surface 22c of the conductive end ring 22, in addition to the outer circumferential surface 22a and the end surface 22b of the conductive end ring 22. In this embodiment, as described above, the conductive reinforcing layer 62 may be formed on a certain portion as necessary with the aid of a jig. The conductive particles 36 may be sprayed from several different directions, as postures of the cold spray apparatus 30 or of the rotor 60 are changed. According to the present embodiment, the outer circumferential surface 22a, the end surface 22b, and the inner circumferential surface 22c of the conductive end ring 22 can be reinforced regardless of the shape of the conductive end ring 22.

Figure 5:
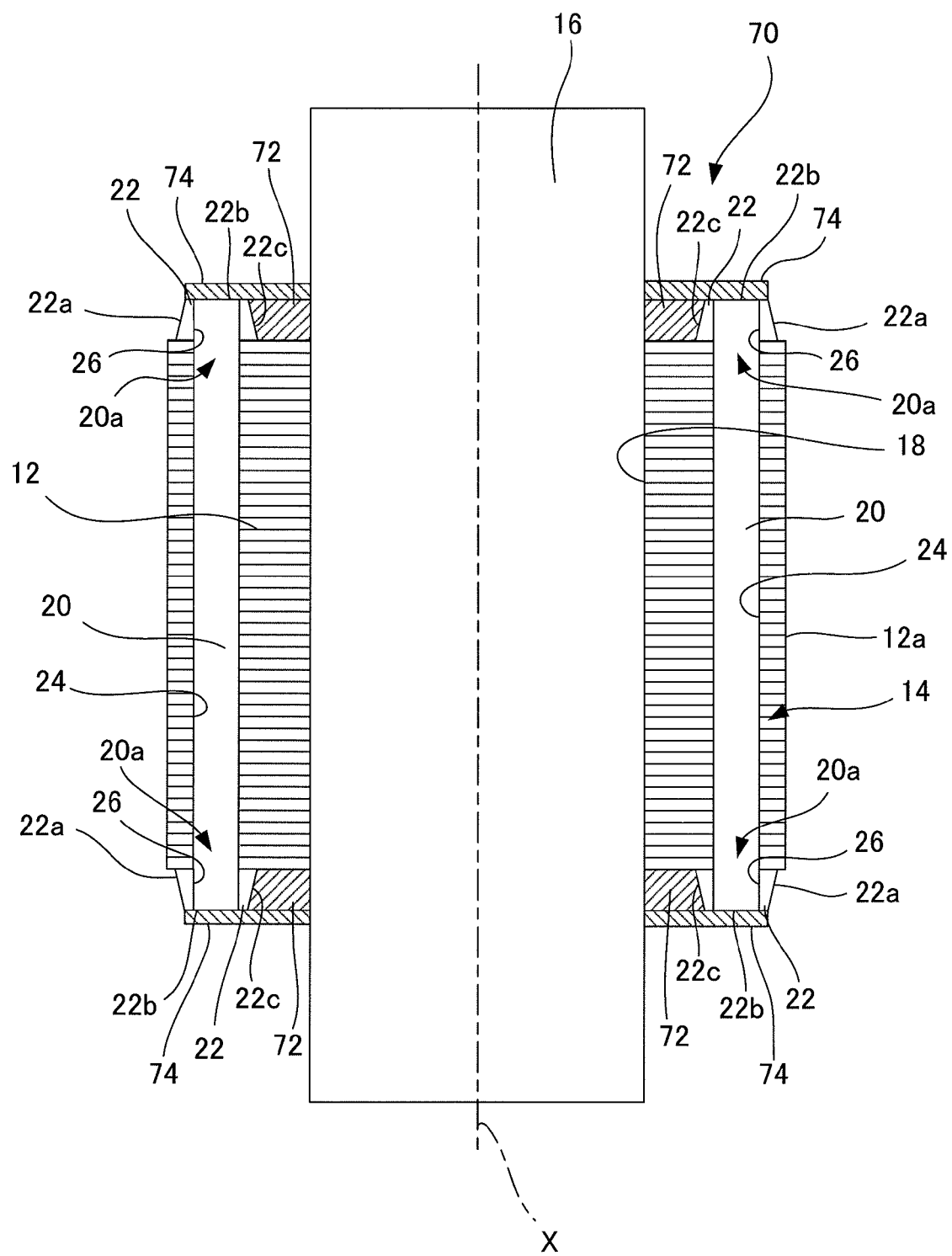
FIG. 5 is a sectional view schematically illustrating a rotor according to a fourth embodiment of the present invention.

FIG. 5 is a sectional view schematically illustrating a rotor 70 according to a fourth embodiment of the present invention. In the rotor 70 according to this embodiment, an annular balancing ring 72 is provided in a gap between the inner circumferential surface 22c of the conductive end ring 22 and the outer circumferential surface of the rotational shaft 16. The balancing ring 72 is used to reduce defects in the rotor resulting from a faulty manufacturing process, for example, cavity or the like that has been formed during casting of the conductive end ring 22. According to the present embodiment, a conductive reinforcing layer 74 is formed on the end surface 22b of the conductive end ring 22 and an end surface of the balancing ring 72. In the present embodiment, as described above, the conductive reinforcing layer 74 may be formed on a certain portion with the aid of a jig. The conductive particles 36 may be sprayed from several different directions, as postures of the cold spray apparatus 30 or of the rotor 70 are changed. According to the present embodiment, both the conductive end ring 22 and the balancing ring 72 can be reinforced regardless of the shapes of the conductive end ring 22 and the balancing ring 72.

Figure 6:
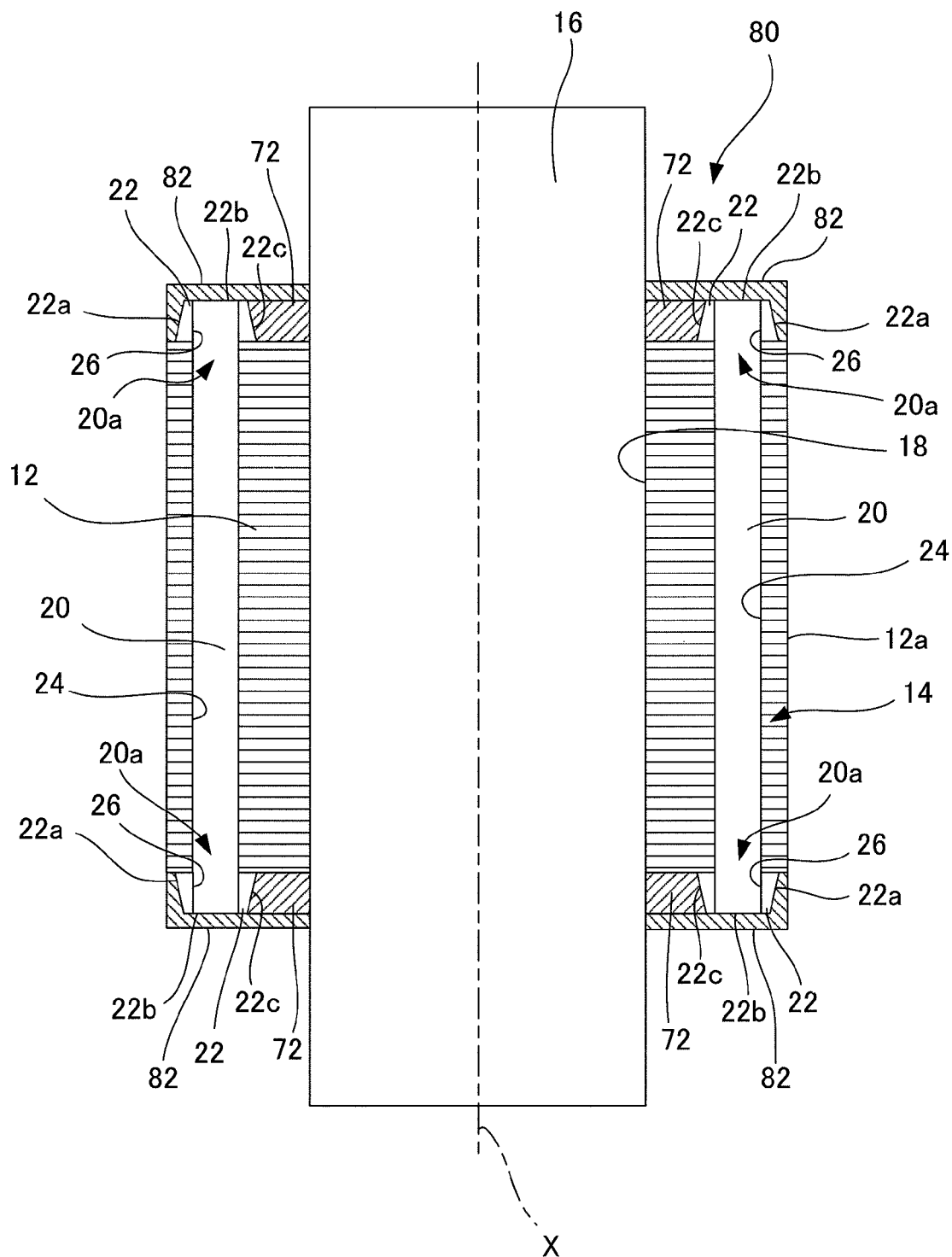
FIG. 6 is a sectional view schematically illustrating a rotor according to a fifth embodiment of the present invention.

FIG. 6 is a sectional view schematically illustrating a rotor 80 according to a fifth embodiment of the present invention. Similarly to the above-described fourth embodiment, the rotor 80 according to the present embodiment includes an annular balancing ring 72 is provided in a gap between the inner circumferential surface 22c of the conductive end ring 22 and the outer circumferential surface of the rotational shaft 16. In this embodiment, the conductive reinforcing layer 82 is formed on the outer circumferential surface 22a of the conductive end ring 22, in addition to the end surface 22b of the conductive end ring 22 and the end surface of the balancing ring 72. In the present embodiment, as described above, the conductive reinforcing layer 82 may be formed on a certain portion with the aid of a jig. The conductive particles 36 may be sprayed from several different directions, as postures of the cold spray apparatus 30 or of the rotor 80 are changed. According to the present embodiment, both of the conductive end ring 22 and the balancing ring 72 can be reinforced regardless of the shapes of the conductive end ring 22 and the balancing ring 72.

Figure 7:
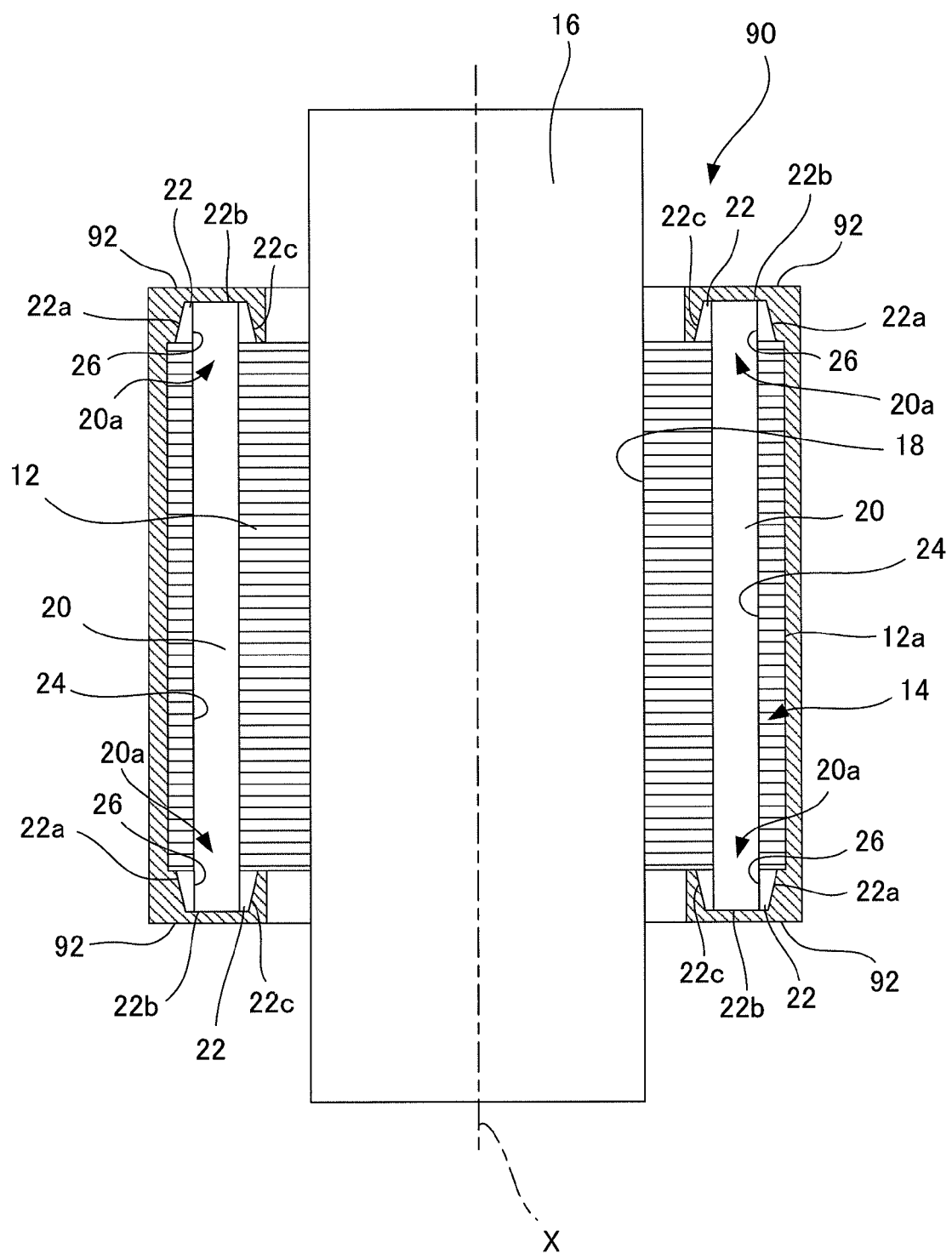
FIG. 7 is a sectional view schematically illustrating a rotor according to a sixth embodiment of the present invention.

FIG. 7 is a sectional view schematically illustrating a rotor 90 according to a sixth embodiment of the present invention. In the rotor 90 according to this embodiment, a conductive reinforcing layer 92 is formed on the outer circumferential surface 12a of the iron core 12, in addition to the outer circumferential surface 22a, the end surface 22b and the inner circumferential surface 22c of the conductive end ring 22. In the present embodiment, as described above, the conductive reinforcing layer 92 may be formed on a certain portion with the aid of a jig. The conductive particles 36 may be sprayed from several different directions, as postures of the cold spray apparatus 30 or of the rotor 80 are changed. According to the present embodiment, both of the conductive end ring 22 and the iron core 12 can be reinforced regardless of the shapes of the conductive end ring 22 and the iron core 12. According to the present embodiment, the rotor 90 applicable to an electric motor operable at high speed without changing a material of the iron core 12.

Configurations of the conductive bars and the conductive end rings are not limited to those described above with reference to the drawings. For example, at least one of the conductive bars and the conductive end rings may be formed by the above-described cold spray process. In this case, metal particles such as copper, copper alloy, aluminum and aluminum alloy are sprayed, while remaining in a solid phase, in order to form the conductive bars and the conductive end rings.

Although each slot 24 extends in the direction parallel to the rotational axis X in the illustrated embodiment, the present invention is not limited to such a configuration. For example, if the iron core 12 formed from stacked plates is skewed, i.e., if the iron core 12 are twisted at both ends thereof in opposite circumferential directions, each slot defines a spiral path. In such an embodiment, the conductive bar is formed into a spiral shape along the path defined by the slot. In the embodiment where the iron core is skewed at both ends thereof, the shape of the conductive end ring is even more complicated. However, according to the present invention in which the conductive reinforcing layer is formed by means of a cold spray process, structural strength of the rotor can be improved as necessary.

In the exemplary sixth embodiment, the conductive reinforcing layer 92 is further formed on the outer circumferential surface 12a of the iron core 12. However, the conductive reinforcing layer being formed on the outer circumferential surface 12a of the iron core 12 can also be applied to any of the other embodiments.

EFFECT OF THE INVENTION

According to the above-described first invention, the conductive reinforcing layer is formed by spraying conductive particles in a solid phase. Accordingly, reinforced structure can be easily obtained regardless of the shape of the target structure such as the conductive end ring. Further, since the conductive reinforcing layer is formed directly on the conductive end ring, there is no need for additional fixing means such as a fixing screw.

According to the above-described second invention, the conductive reinforcing layer is also formed on the iron core. Therefore, the structural strength of the rotor is further increased, and the rotor can be applied to an electric motor operable at high speed.

According to the above-described third invention, the conductive reinforcing layer is made of a non-magnetic material, and therefore, magnetic flux or the like can be prevented from leaking.

According to the above-described fourth invention, the materials having sufficiently high specific strength are used to form the conductive reinforcing layer, and thus, the conductive reinforcing layer with increased structural strength can be provided.

According to the above-described fifth invention, conductive particles in a solid phase are sprayed in order to form the conductive reinforcing layer. Accordingly, the reinforced structure can be easily formed regardless of a shape of a target structure that should be reinforced. Further, since the conductive reinforcing layer is formed directly on the conductive end ring, there is no need for an additional process such as screw fixing.

According to the above-described sixth invention, conductive particles of a solid-phase state are sprayed in order to form the conductive reinforcing layer on the iron core, too. Accordingly, structural strength of the rotor is further increased without additional reinforcing means.

Although the invention has been shown and described with exemplary embodiments thereof, it should be understood by those skilled in the art that the foregoing and various other changes, omissions and additions may be made therein without departing from the spirit and scope of the invention.

What is claimed is:

1. A rotor comprising:
   a cylindrical iron core having a through hole for receiving a rotational shaft; and
   a squirrel-cage conductive body including a plurality of conductive bars and a pair of annular conductive end rings provided at both ends of the plurality of conductive bars, the conductive bars extending along a direction in which the rotational shaft is received and being arranged at an outer circumference of the iron core at certain intervals, wherein
   a conductive reinforcing layer extends on at least a part of an outer surface of the conductive end ring, the conductive reinforcing layer being formed by spraying conductive particles in a solid phase onto the outer surface of the conductive end ring.

2. The rotor according to claim 1, wherein the conductive reinforcing layer further extends on at least a part of an outer surface of the iron core.

3. The rotor according to claim 1, wherein the conductive particles of the conductive reinforcing layer are made of a non-magnetic material.

4. The rotor according to claim 3, wherein the non-magnetic material is stainless steel, titanium, or titanium alloy.

5. A manufacturing method for manufacturing a rotor, the rotor comprising: a cylindrical iron core having a through hole for receiving a rotational shaft; and a squirrel-cage conductive body including a plurality of conductive bars and a pair of annular conductive end rings provided at both ends of the plurality of conductive bars, the conductive bars extending along a direction in which the rotational shaft is received and being arranged at an outer circumference of the iron core at certain intervals, wherein
   the method comprises:
   spraying conductive particles in a solid phase onto at least a part of an outer surface of the conductive end ring so as to form a conductive reinforcing layer thereon.

6. The method according to claim 5, further comprising spraying conductive particles in a solid phase onto at least a part of an outer surface of the iron core so as to further form a conductive reinforcing layer thereon.

* * * * *